INVENTORS
MARCEL JEAN BERTRAND
PAUL HEINRICH MOTZHEIM
BY Jay L Chase
ATTORNEY

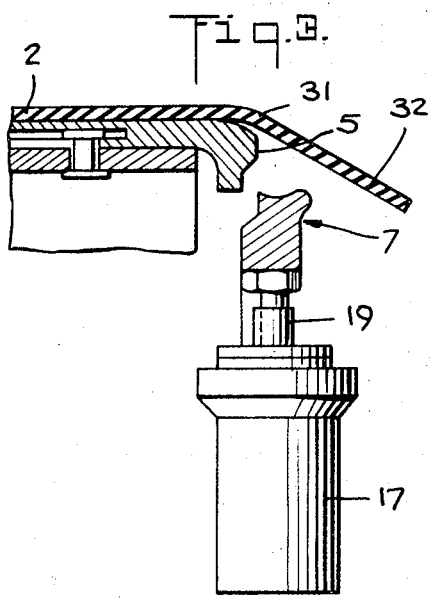
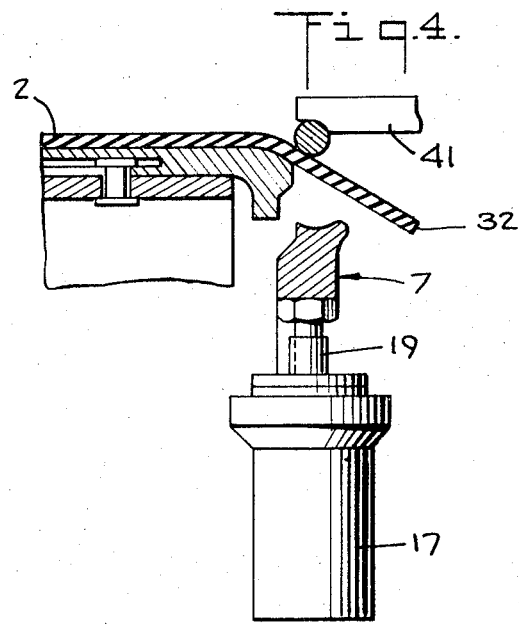
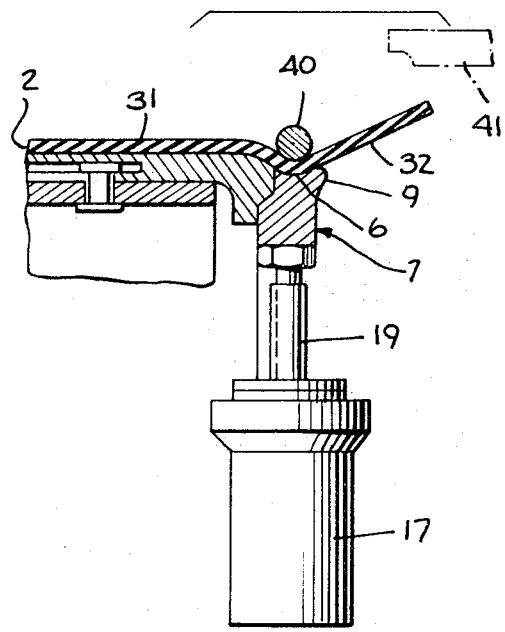
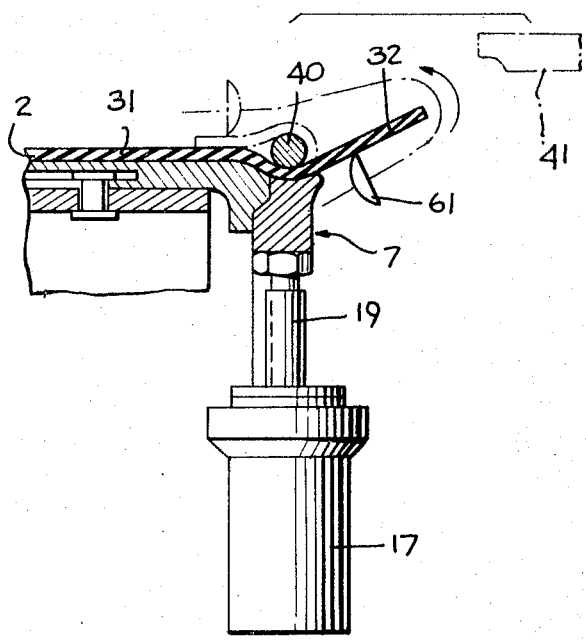

United States Patent Office 3,745,085
Patented July 10, 1973

3,745,085
TIRE BUILDING DRUM FOR POSITIONING A BEAD RING
Marcel Jean Bertrand, Grivegnee-Liege, Belgium, and Paul Heinrich Moitzheim, Laurensberg, Germany, assignors to Uniroyal A.G., Aachen-Rothe-Erde, Germany
Filed Jan. 6, 1971, Ser. No. 104,264
Claims priority, application Germany, Jan. 13, 1970, P 20 01 204.8
Int. Cl. B29h 17/16, 17/22
U.S. Cl. 156—400                    14 Claims

ABSTRACT OF THE DISCLOSURE

A tire building drum has adjacent respective edges of a cylindrical drum section a plurality of radially movable segments. The circumferential outer surface of the segments forms an arcuate surface. A plane of separation between the segments and the drum section edge intersects the arcuate surface at approximately the most radially inward portion of the arcuate surface. The tire building drum is particularly useful for positioning the bead wire ring during the turn-up of a metal reinforced carcass ply.

---

This invention relates to tire building drums, and in particular to a drum having radially movable segments.

It is known that in the building of a pneumatic tire, first cylindrical carcass having one or more plies of rubberized tire cord fabric interconnecting spaced bead cores is formed, then the bead cores are moved toward one another while the central portion of the carcass is expanded to a predetermined larger diameter to change the carcass shape from cylindrical to toroidal, and then a breaker consisting of one or more breaker cord plies is applied circumferentially to the crown region of the carcass. Finally, the rubber stocks to constitute the sidewalls and a tread are added to the appropriate regions of the expanded carcass. These steps are conventionally performed either in a single-stage building operation, employing an inflatable drum capable of having both its diameter and its axial length changed, or in a two-stage building operation in which the cylindrical carcass is initially formed on a first, generally rigid drum and is then transferred to a second, inflatable drum to be expanded into toroidal form.

In certain drums employed in the conventional single-stage building operation, the bead cores are initially fitted over the portions of the carcass ply material overlying the respective cylindrical, usually metallic, end members of the drum which are interconnected by an inflatable, cylindrical rubber diaphragm. Respective externally circumferentially grooved segmental components of these end members underlying the bead cores are then displaced radially outwardly by internal fluid pressure-inflatable bags until the bead cores and the underlying regions of the ply material are received and gripped in the said grooves. This, of course, precedes the ply turn-up and carcass-shaping operations.

It has been found, however, that the described bead gripping system is not always acceptable for all tire building operations. Especially where the carcass ply material is relatively stiff, for example where steel wires or cables are incorporated therein as the reinforcing elements, the occurrence of some slippage or rotational movement of the carcass ply material and of the rubber elements of the bead regions relative to the bead cores both during the ply turn-up operation and during the subsequent carcass-shaping operation cannot be avoided. This produces irregularities of the structure of the tires in the bead regions thereof and is also conductive to premature failure of such tires by bead separations.

It is an important object of the present invention, therefore, to provide means in a tire building drum enabling the aforesaid drawbacks and disadvantages to be efficaciously overcome.

A more specific object of the present invention is the provision of a tire building drum which characterized by bead-gripping means will prevent any slippage or rotational movement of the carcass ply material relative to the bead cores during the ply turn-up operation.

The present invention will be more clearly understood from the following detailed description when read in conjunction with the accompanying drawings, in which:

FIGS. 3 to 6 are fragmentary, schematic views showing the sequence of operation of the tire building drum according to an embodiment of the present invention;

Figure 1:
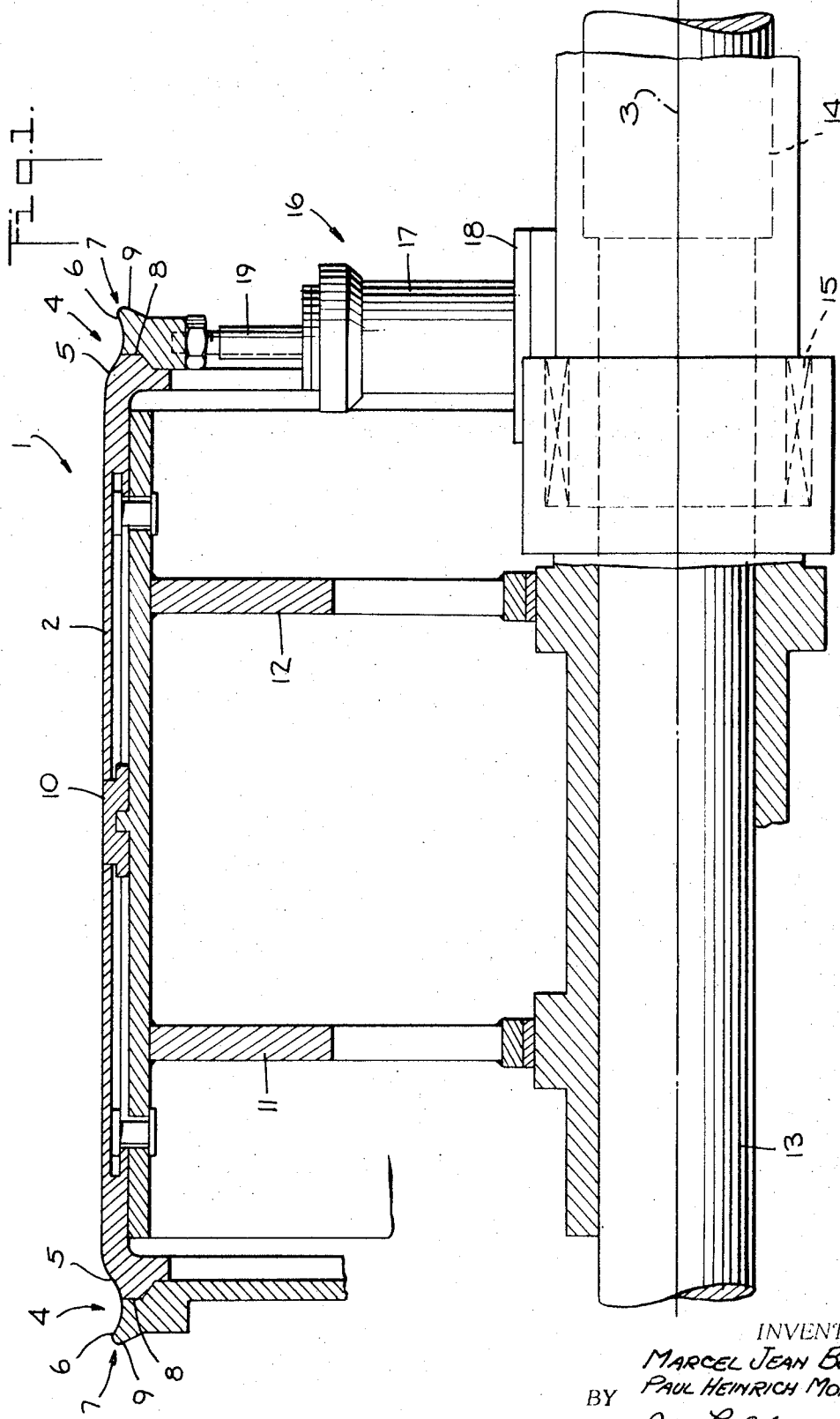
FIG. 1 is a sectional view, partly in elevation and schematically showing the tire building drum according to the present invention.

The drum 1 of FIG. 1 for building a carcass for a pneumatic tire has a cylindrical section 2, having a longitudinal axis 3. Adjacent each edge of the drum section 2 is a plurality of segments 7 which are radially movable with respect to the axis 3. In a preferred embodiment the circumferential outer surface of the segments can form with each edge of drum section 2 an annular arcuate surface 4. The arcuate surface 4 may be divided into two curved portions 5 and 6. Curved portion 5 extends from the drum section 2 in a descending manner which may form a shoulder for the bead wire ring 40 (shown in FIGS. 3 to 6), as will be described hereafter. Curved portion 6 extends from the shoulder 5 in an ascending manner and forms the circumferential surface of the segments 7. The curved portions 5 and 6 are divided at a vertical contacting plane 8 of separation which intersects the arcuate surface 4 at approximately the most radially inward portion of the arcuate surface 4, i.e., the deepest point. The plane 8 of separation preferably should intersect the arcuate surface 4 at a point which is axially inward of the most radially inward portion of the arcuate surface. This point of separation allows shoulder 5 to terminate in a descending curved portion and ensures positioning of the bead wire ring. The ascending curved portion 6 has a terminus 9 which forms a circle when the segments are radially extended. In one embodiment of the invention the diameter of this circle is less than the diameter of the cylindrical section 2. As the diameter of this circle is less than that of the section 2, the segment 7 when radially extended do not extend beyond the edge of the section 2. This permits the turn-up of the carcass ply about the bead wire ring. The axial length of the drum 1 is generally defined by the distance between the terminus 9 of the segments 7.

Figure 2:
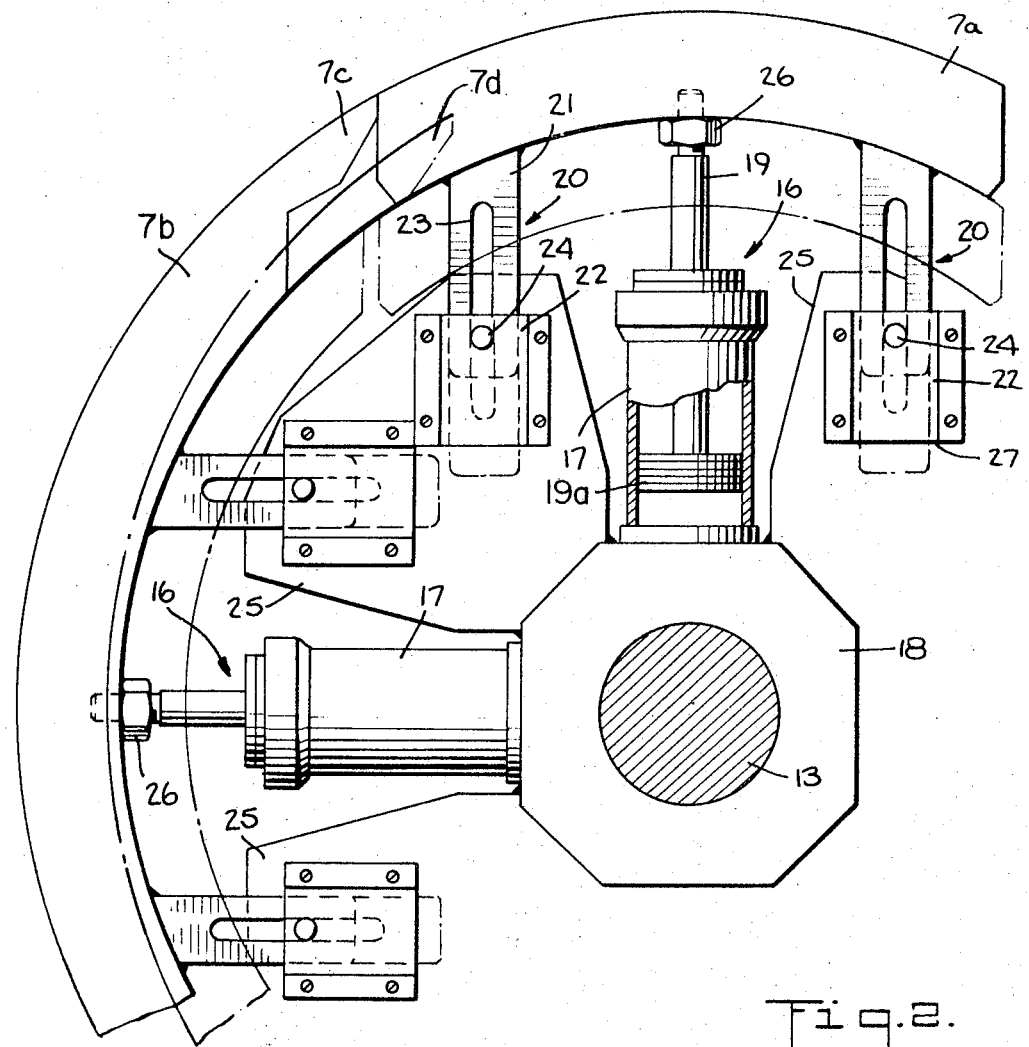
FIG. 2 is a schematic front view of the movable segments adjacent each end of the drum, according to an embodiment of the present invention.

The cylindrical section 2 of the drum may be in the form of a hollow body. Disposed within the hollow body are cross members 11 and 12 which are attached to the cylindrical section and to a shaft 13. A cylindrical spacer element 10 generally divides the drum section 2 into two parts. The spacer element 10 is removable so as to allow the overall axial length of the drum to be varied and thereby allow for tires of different dimensions. The cross members 11 and 12 may be radially contractible and axially movable about longitudinal axis 3 in a manner well known in the art. An example of such a drum is shown in the apparatus described in U.S. Pat. No. 3,078,-204, Appleby. Alternatively the cylindrical drum section 2 can be non-expansible, in a manner well known in the art. For example such a drum is shown in the apparatus described in U.S. Pat. No. 3,489,634, Pizzo et al. A clutch cooperates with rotatable drive shaft 14 to control the rotation of the building drum 1 around shaft 13. The segments 7 when in the radially extended position form a substantially continuous rigid circular surface which is concentric about axis 3 and cylindrical drum section 2. The segments 7, as shown in FIG. 2, comprise segment parts 7a and 7b which, when radially retracted overlap one another in a circumferential direction, as at 7d. It will be understood that although FIG. 2 shows only two segment parts, the segments form a complete ring about shaft 13 and may constitute as many segments as desired.

In one embodiment each segment part 7a and 7b is movable radially inward and outward by a respective piston-cylinder unit 16. As shown in FIG. 2, the unit 16 comprises a cylinder 17 which is rigidly attached to a center support 18. The center support 18 is concentric with shaft 13 and attached thereto so as to rotate with shaft 13. Disposed within cylinder 17 is a piston 19a attached to a piston rod 19. The piston rod 19 is rigidly attached at one end to a respective segment part by screw-threading and lock nut 26. The piston-cylinder unit is operated by any suitable fluid pressure medium, as for example, hydraulic or pneumatic.

Arranged on each side of unit 16 are guide means 20 comprising a plate 21 and an elongated guide 22. Each segment part has two guide means 20 to insure that the radial movement of each segment part is linear and unobstructed. The plate 21 at one end is rigidly fixed to each respective segment part. The elongated plate 22 is rigidly attached to a radial support 25 which extends from center piece 18. The free end of plate 21 is slidably disposed within a slot 27 formed by plate 22 and support 25. Plate 21 may contain an elongated hole 23 through which passes a cross pin 24. The fixed location of cross pin 24 on plate 22 may be adjusted to limit the stroke of piston-cylinder unit 16 and thereby control the limit of radial extension of each respective segment. As shown in FIG. 2, segment part 7c overlaps the adjacent segment part 7a when the segments are in the radially retracted position.

FIG. 2 shows in full line the segments 7a, 7b in the radially extended position and in dotted line the segments are radially retracted. When moving to the radially extended position, segments 7b move first, followed by segment 7a.

The sequential operation of the building drum according to one embodiment of the invention is shown in FIGS. 3 to 6. The segments 7 are shown in FIG. 3 in a radially retracted position. A reinforced carcass 31 is arranged about the cylindrical section 2, with respective end portions 32 protruding over the shoulder 5 and segments 7. The reinforced carcass can be formed directly on the building drum 1 or can be hose-shaped (so-called "pocket" method) and delivered to the building drum. The natural tension of the reinforced fabric causes the protruding end portion 32 to turn radially inward. Alternatively, a suitable tool, may turn the protruding end portion 32 radially inward as the drum rotates, following generally the curved surface of the shoulder 5. The bead wire ring 40 is then arranged over the protruding end portion 32 and placed against the carcass generally at shoulder 5 by a bead setting device 41. A suitable bead setting device is shown and described in the above recited U.S. patents. The bead wire ring 40 has an internal diameter which is less than the diameter of the cylindrical section 2. The segments 7 are then radially extended, as shown in FIG. 5, so that the curved portion 6 and the terminus 9 urges the protruding end portion 32 to turn radially outwardly and around bead wire ring 40. As the segments 7 radially extend, the bead wire ring 40 is circumferentially pressed against the shoulder 5 and is thereby accurately centered with respect to the carcass. When the segments 7 are fully radially extended, the bead wire ring 40 will be positioned generally in the annular arcuate surface 4. The bead setting device 41 is then axially removed.

A tool, such roller 61, then turns the protruding end portion 32 around the bead wire ring 40 while the drum 1 rotates. The tool 61 follows the path shown by the arrow in FIG. 6 to cause the end portion 32 to fold over the bead wire ring 40 and lay against the carcass 31.

Cross members 11 and 12 may then be actuated to radially collapse the cylindrical section 2 in order to remove the completed carcass from the building drum. In addition, the cross members 11 and 12 may be axially moved inwardly so as to further process the carcass into a toroidal shape.

In a further embodiment the internal diameter of the bead wire ring may be greater than the diameter of the cylindrical section 2, but less than the diameter of the drum section 2 with the reinforced carcass ply arranged thereon. Alternatively the internal diameter of the bead wire ring may be greater than the drum section with the carcass ply arranged thereon. The bead wire ring may be held mechanically in place surrounding the protruding end portion. The segments are then radially extended to turn the protruding end portion radially outward and around the bead wire ring. A tool then can complete the folding over of the end portion around the bead wire ring and lay against the carcass.

Figure 7:
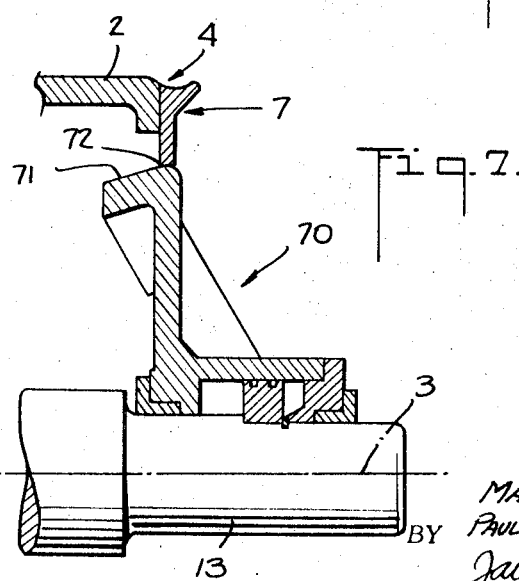
FIG. 7 is a fragmentary schematic view of a further embodiment of the movable segments.

FIG. 7 shows a further embodiment for radially moving the segments 7. Segments 7 are radially moved by cam means 70 which is axially retractable along longitudinal axis 3. Cam means 70 has a cam surface 71 which is inclined with respect to the cam mating surface 72 of segment 7. When cam means 70 is axially moved to the right, of FIG. 7, segments 7 radially retract. When cam means 70 is axially moved to the left, of FIG. 7, segments 7 radially extend. The cam surface 71 of cam means 70 is generally cone-shaped so as to simultaneously radially move the segments. The sequence of operation with cam controlled segments is the same as the embodiment using a piston-cylinder unit.

While several embodiments of the invention have been shown and described, it will be obvious to those skilled in the art that various changes and modifications may be made without departing from the broadest aspects of the invention. It is therefore intended to cover in the appended claims all such changes and modifications as fall within the spirit and scope of this invention.

What we claim is:

1. A tire building drum comprising a cylindrical section having a longitudinal axis;
    said section having adjacent at least one edge thereof a plurality of segments radially movable with respect to said axis;
    said segments when fully radially extended having a continuous circumferential outer surface which forms with said cylindrical section edge a bead ring receiving annular surface having a continuous arcuate cross-section;
    a portion of said arcuate surface being formed by said edge and a further portion being formed by said outer surface of the segments;
    said segments and said cylindrical section edge having a contacting plane of separation intersection said arcuate surface at approximtely the most radially inward portion of the arcuate.

2. A tire building drum as claimed in claim 1 in which the plane of separation is located on said arcuate surface at a point axially inward of the most radially inward portion of the surface.

3. A tire building drum as claimed in claim 1 in which the minimum diameter of the annulus formed by said arcuate surface is less than the diameter of the cylindrical section.

4. A tire building drum as claimed in claim 1 in which the arcuate curved surface of said segments has a terminus in a circle having a diameter less than the diameter of the cylindrical section.

5. A tire building drum as claimed in claim 4 in which the circle diameter is greater than the diameter of the annulus at the most radially inward portion of the arcuate surface.

6. A tire building drum as claimed in claim 4 in which the segments are adjacent the edges of said cylindrical section the axial length of said drum being bounded by the terminus of the arcuate surface of said segments.

7. A tire building drum as claimed in claim 1 in which the annular arcuate surface includes said cylindrical section edge when the segments are in the radially extended position.

8. A tire building drum ac claimed in claim 7 in which the arcuate surface between said section edge and said plane of separation is radially descending and the arcuate surface between said plane of separation and said segments is radially ascending.

9. A tire building drum as claimed in claim 1 in which the arcuate surface between said section edge and said plane of separation is radially descending and the arcuate surface between said plane of separation and said segments is radially ascending.

10. A tire building drum as claimed in claim 1 in which the arcuate surface between the plane of separation and said cylindrical section edge forms a shoulder for engaging a bead wire ring.

11. A tire building drum as claimed in claim 1 in which said segments when radially extended do not extend beyond the edge of said cylindrical section.

12. A tire building drum as claimed in claim 1 in which the segments when radially extended form a continuous rigid circular surface concentric with said cylindrical section.

13. A tire building drum as claimed in claim 12 in which adjacent segments when radially retracted have overlapping parts.

14. A tire building drum as claimed in claim 12 including means for radially moving each segment and each segment having associated therewith guide means for radially guiding the segment.

References Cited
UNITED STATES PATENTS

| | | | |
|---|---|---|---|
| 3,237,199 | 2/1966 | Brey | 156—398 |
| 3,125,482 | 3/1964 | Niclas et al. | 156—414 |
| 3,547,733 | 12/1970 | Leblond | 156—415 |

ALFRED L. LEAVITT, Primary Examiner

C. B. COSBY, Assistant Examiner

U.S. Cl. X.R.

156—132, 135, 417

PO-1050
(5/69)

UNITED STATES PATENT OFFICE
CERTIFICATE OF CORRECTION

Patent No. 3,745,085    Dated July 10, 1973

Inventor(s) M. Jean Bertrand et al.

It is certified that error appears in the above-identified patent and that said Letters Patent are hereby corrected as shown below:

In claim 1, column 4, line 63, change "intersection" to --intersecting--; and line 64, change "approximtley" to --approximately--. In claim 8, column 5, line 15, change "ac" to --as--.

Signed and sealed this 5th day of March 1974.

(SEAL)
Attest:

EDWARD M. FLETCHER, JR.
Attesting Officer

C. MARSHALL DANN
Commissioner of Patents